US008186073B2

(12) United States Patent
Nethery

(10) Patent No.: US 8,186,073 B2
(45) Date of Patent: May 29, 2012

(54) QUILTING TEMPLATE AND RULER

(76) Inventor: Patti L. Nethery, Conroe, TX (US)

( * ) Notice: Subject to any disclaimer, the term of this patent is extended or adjusted under 35 U.S.C. 154(b) by 0 days.

(21) Appl. No.: 12/915,378

(22) Filed: Oct. 29, 2010

(65) Prior Publication Data

US 2012/0102771 A1 May 3, 2012

(51) Int. Cl.
*G01B 3/14* (2006.01)

(52) U.S. Cl. .......................................... 33/566; 33/562

(58) Field of Classification Search .................... 33/562, 33/563, 566, 1 B See application file for complete search history.

(56) References Cited

U.S. PATENT DOCUMENTS

| | | | | |
|---|---|---|---|---|
| 5,791,062 | A * | 8/1998 | Walker | 33/563 |
| 5,819,422 | A * | 10/1998 | Schafer | 33/1 B |
| 6,155,189 | A | 12/2000 | Walner | |
| 6,276,070 | B1 * | 8/2001 | Hawley | 33/563 |
| 6,321,458 | B1 | 11/2001 | Hess | |
| 6,839,971 | B2 * | 1/2005 | Schafer et al. | 33/1 B |
| 6,925,724 | B2 * | 8/2005 | Tandy | 33/563 |
| 7,251,898 | B2 * | 8/2007 | Schafer et al. | 33/1 B |
| 7,448,142 | B2 * | 11/2008 | Geier | 33/566 |
| 7,703,214 | B2 | 4/2010 | Platt | |
| 7,730,842 | B1 | 6/2010 | Sebrow | |
| 7,770,303 | B2 | 8/2010 | Graham et al. | |
| 7,854,073 | B1 * | 12/2010 | Webb | 33/566 |
| 8,011,111 | B2 * | 9/2011 | Brady | 33/562 |
| 2004/0049935 | A1 * | 3/2004 | Tandy | 33/563 |
| 2005/0178013 | A1 * | 8/2005 | Schafer et al. | 33/1 B |
| 2009/0025245 | A1 * | 1/2009 | Brady | 33/562 |
| 2010/0223798 | A1 * | 9/2010 | Zimmerman | 33/494 |
| 2011/0010955 | A1 * | 1/2011 | Zaremski | 33/492 |

OTHER PUBLICATIONS

"Connecting Threads" p. 56, Oct. 2010.
"Clover USA Trace 'n Create Quilt Templates (Dresden Plate & Fan Collection)".
"Snowball Blocks", www.straw.com, pp. 1-8; 2001.
"Half-Square Triangle Stencil Demonstration." Sunday's Best Quiltworks. p. 1-6.
"Magic Base Blocks." p. 12-14. That Patchwork Place, Inc., 1996.
"Quilting Rulers, Quilting Templates, Quilting Sewing Rulers.." Ginger's Needleworks & Quilting, 13 pages, www.quiltknit.com.

* cited by examiner

*Primary Examiner* — Yaritza Guadalupe-McCall
(74) *Attorney, Agent, or Firm* — John J. Love; Claude E. Cooke, Jr.; Cooke Law Firm

(57) ABSTRACT

A combined template and ruler for use in quilting is formed from a rigid plastic material and includes a plurality of spaced slots that correspond to cutting and sewing lines that are marked on layers of fabric using the template. The cutting and sewing lines are positioned such that a plurality of half square triangles of two ply material are formed without cutting the thread. A template and method of forming snowball blocks in a similar fashion is also disclosed.

16 Claims, 4 Drawing Sheets

QUILTING TEMPLATE AND RULER

BACKGROUND OF INVENTION

1. Field of the Invention

The present invention relates to a combined quilting template and ruler that is used for marking sewing and cutting lines on fabric for making a plurality of half square triangle pieces used for forming patterns in quilts. The ruler can also be used as a cutting edge for initially cutting the bulk fabric into the appropriate size for formation of the fabric blank that will be utilized for creating the individual half square triangles. A template and method for making snowball blocks is also disclosed.

2. Description of Related Art

Half square stencil sets are available that include cutting and sewing lines. They are made of very thin flexible plastic material that is not suitable for functioning as a straight edge for cutting and they are not laid out in such a manner as to allow stitching without cutting the thread.

Typically in quilting, a quilter cuts out the fabric pieces, sews the fabric pieces together to form a quilt block, "squares up" the quilt block, and sews each quilt block together forming a quilt top.

BRIEF SUMMARY OF THE INVENTION

The present invention includes a combined template and ruler in a single device that can be used to lay out the cutting and stitching pattern and also can be used as a ruler for initially cutting the material and then as a ruler for cutting the sewn material into a plurality of half square triangles. Use of this device substantially reduces that amount of time required to construct half square triangles from bulk material.

With the combination ruler and template of the invention disclosed herein, a quilter sews the fabric base following a marked design, cuts apart the fabric pieces formed with the marked and sewn design, and sews the fabric pieces together to form a block. The precision built into the rules/templates speeds up the process and eliminates the "squaring up step."

DETAILED DESCRIPTION OF THE INVENTION

Figure 1:
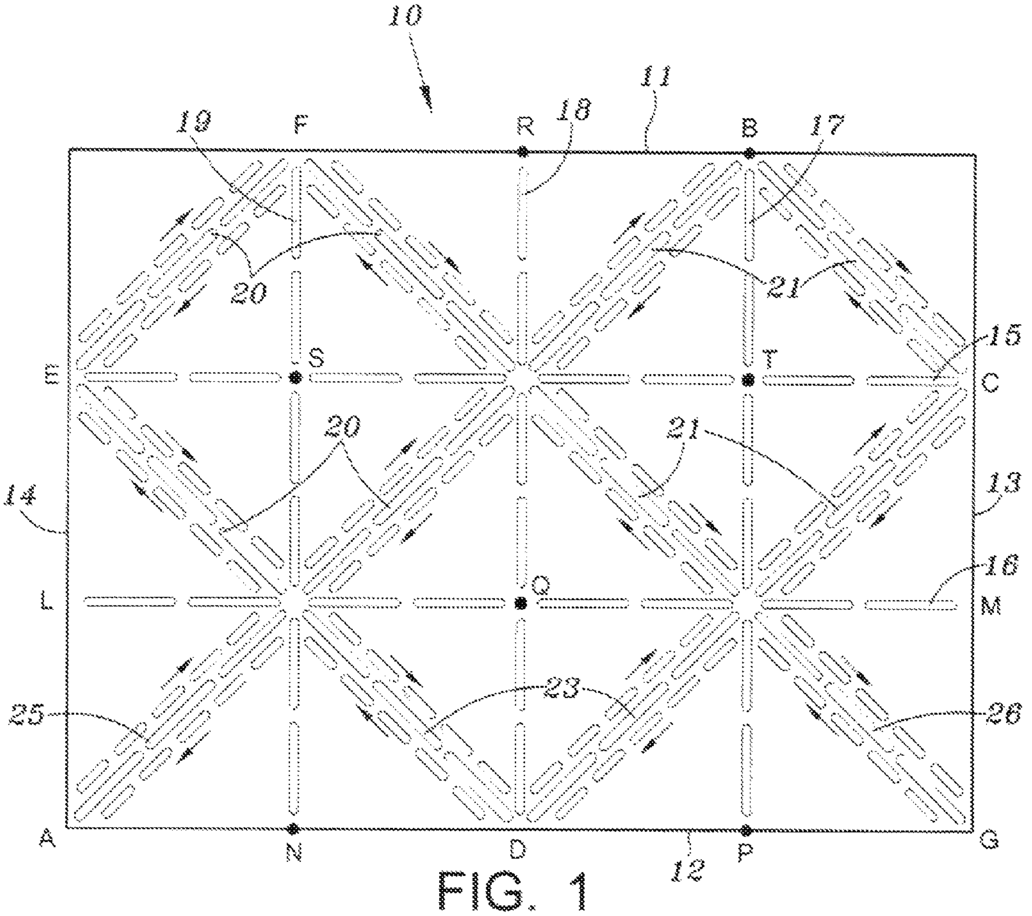
FIG. 1 is a top view of a template according to an embodiment of the invention.

As shown in FIG. 1, the template 10 of the present invention comprises a generally flat planar member in the shape of a rectangle having a top edge 11, a bottom edge 12 and two side portions 13, 14. The template is made of a sheet of transparent or translucent plastic material such as an acrylic material and is relatively rigid so that the edges 11, 12, 13, and 14 can be used as a straight edge for purposes of cutting fabric in a manner to be discussed below. The template includes a plurality of spaced marking slots for marking cutting lines and sewing lines. The thickness of the sheet is about one-sixteenth to about three-sixteenth of an inch.

Cutting slots of any suitable length are formed along horizontal cutting lines 15 and 16 and along vertical cutting lines 17, 18, and 19. Additional cutting slots are positioned along diagonal cutting lines 20, 21, 23, 25, and 26. Sewing slots of any suitable length are located along both sides of cutting lines 20, 21, 23, 25, and 26. The horizontal and vertical cutting lines extend from one edge of the template to the other.

Points A, B, C, D, E, F, and G are marked on the top, sides, and bottom surfaces of the template to serve as guides for the sewing sequence as will be discussed. Also marked on the template are points L, M, N, P, Q, R, S, and T for indicating places where the two pieces of fabric may be pinned together.

In order to form 24 half triangle squares the following method should be followed.

Two pieces of fabric are placed on top of each other with right sides together on a rotary cutting mat. Next the template is placed on top of the fabric and a rotary cutting tool is used to trim the two fabric pieces to correspond to the size of the template or slightly larger. A mechanical pencil or chalk pen can be used to mark the cutting lines and sewing lines on the fabric through the slots in the template.

Figure 2:
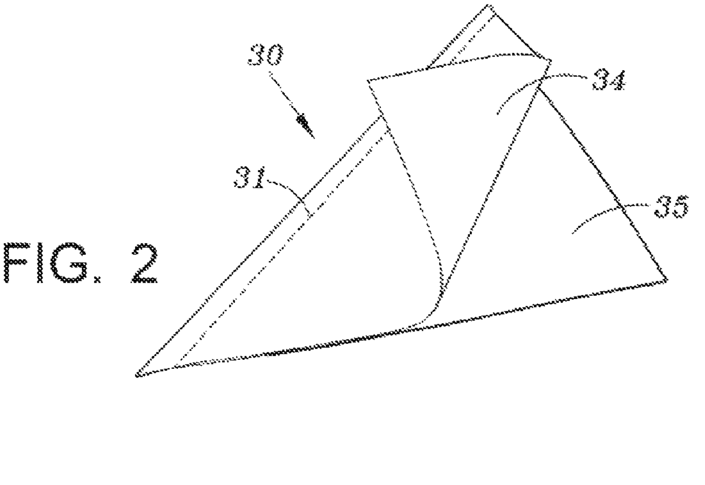
FIG. 2 is a view of a half square triangle.

Pins can now be placed at some or all of the locations indicated on the template, namely L, M, N, P, Q, R, S, and T. Starting at location A, the quilter sews to point B along the top sew line indicated by the arrows on the drawing, and then to points C; D, E, F, and G. At point G the quilter reverses direction as shown by the arrows back to F and then to E, D, C, B, and A. This can be done without cutting the thread. At this point the pins are removed and the fabric may be pressed. Next, using the template as a cutting edge, cuts are made through vertical cutting lines 17, 18, and 19. Following this step, the quilter then cuts along horizontal cutting line 15 and 16. Lastly the quilter cuts along diagonal cutting lines 20, 21, 23, 25, and 26. This will result in the formation of twenty four half square triangles, one of which is shown in FIG. 2. The two layers of fabric are sewn along the hypotenuse of the right triangles. Depending on the size of the template, the size of the resultant half square triangles can be varied. For example, a 20½" by 15⅜" template produces 24 half square triangles that are 4½". A 16½" by 12⅜" template produces 24 half square triangles that are 3½ inches and a 12½" by 9⅜" template produces 24 half square triangles that are 2½". Each sewing line is parallel to the cutting line and is spaced about ¼" from the cutting line. Slip resistant surfaces may be secured to the underside and top of the template to prevent the template from sliding on the fabric, or the bottom surface may be roughened. Templates may be manufactured to produce any size half-square triangle.

In lieu of the full template shown in FIG. 1, a template could be formed by separating the template into two portions simply by cutting the template into two pieces along line 18. A template representing just half of the template shown in FIG. 1 could also be constructed. Although square rectangles have been used for illustration, the template could be constructed to define non-square rectangles and half-rectangular pieces.

Figure 3:
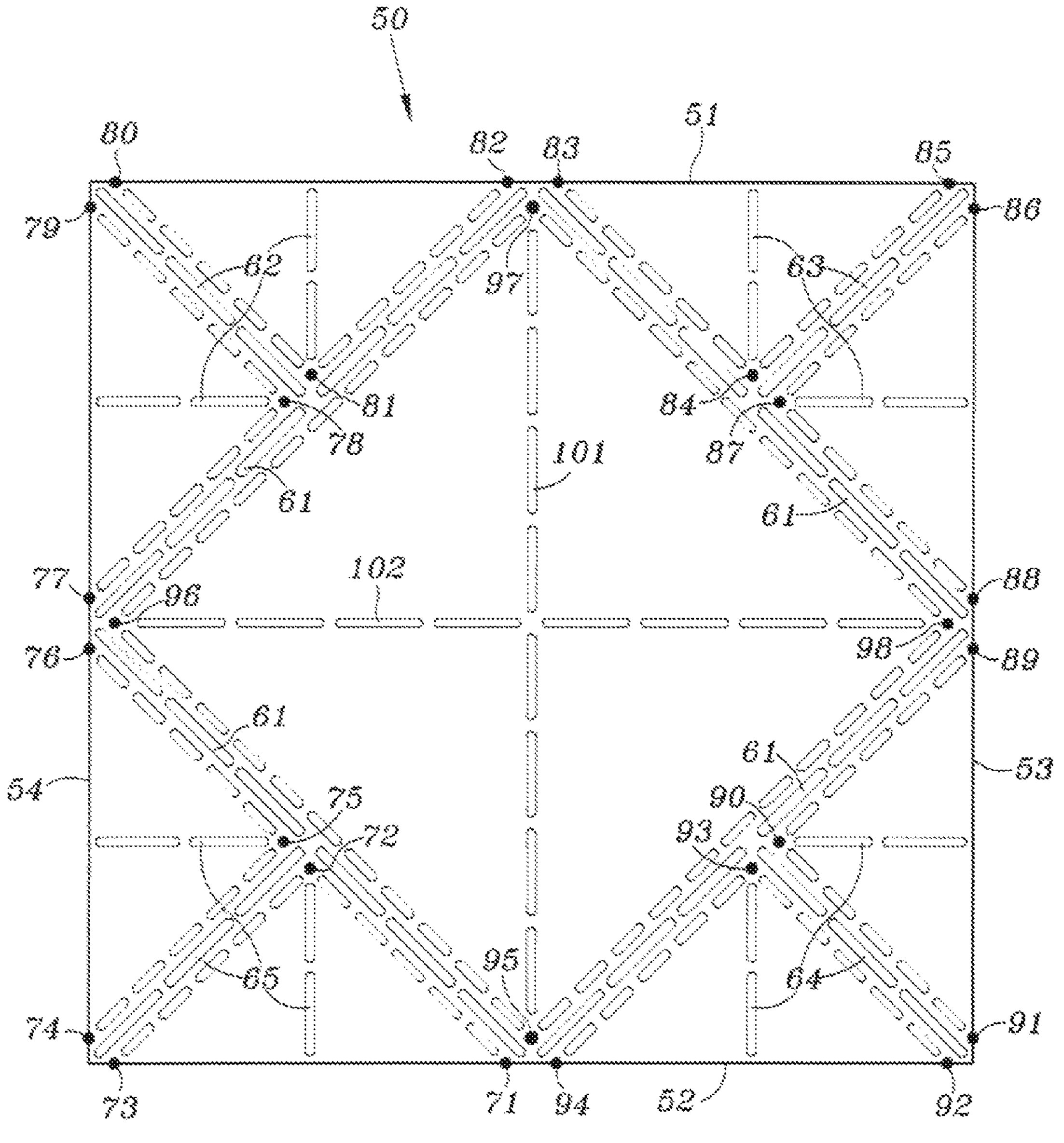
FIG. 3 is a top view of a second embodiment of the invention.

A second embodiment of the invention is shown in FIG. 3. This template will result in the formulation of four half square triangles and sixteen smaller half square triangles.

Cut lines are formed by spaced elongated slots of any suitable length along lines 61, 62, 63, 64, and 65. The template is a flat sheet of relatively rigid plastic material and may be transparent or translucent. The panel includes upper and lower edges 51, 52 and side edges 53, 54. A horizontal cut line 102 is formed by a plurality of spaced slots and a vertical cut line 101 is also formed by a plurality of spaced slots extending from an upper surface to a lower surface of the panel. In a similar fashion, sewing lines are formed by a plurality of spaced slots along lines formed between points 71 thru 94. Sewing lines are also formed between points 95 thru 98 as shown in FIG. 3. Pin points may also be indicated on the template.

The use of the template of FIG. 3 is similar to that of FIG. 1. The template is placed on two layers of fabric and the fabric is cut along edges 51-54 to correspond to the shape of the template. The cut and sewing lines are then marked on the fabric by utilizing a marking device through the slots formed through the template. The template is then removed and the fabric layers are pinned together. The two layers are sewn together along sewing lines formed between points 71 thru 94, and then from 95-98-97-96-95. This may be accomplished without cutting the thread. The two layer fabric can then be cut along the cut lines 61 thru 65 and 101 and 102 thereby forming the four half square triangles of a first size and sixteen half square triangles of a second size.

Figure 4:
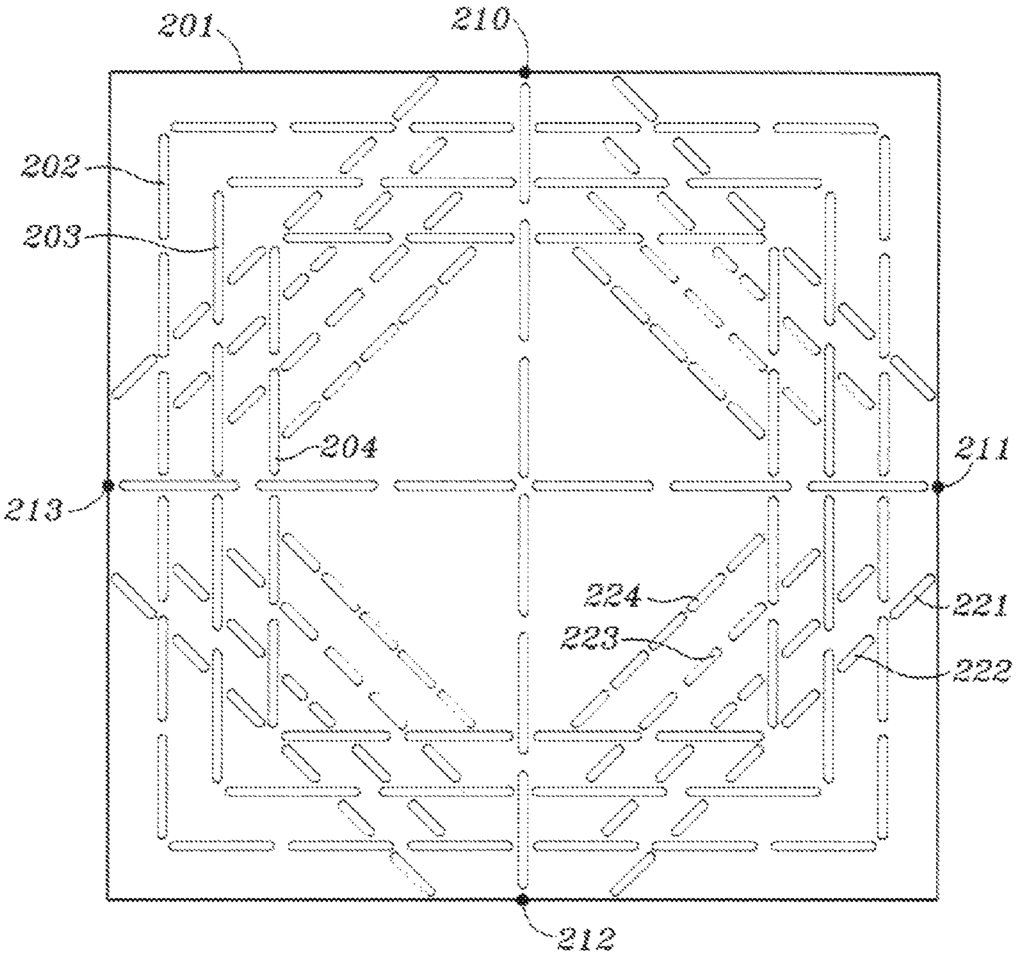
FIG. 4 is a top view of another embodiment of the invention.

FIG. 4 illustrates another aspect of the invention which can be used to make "snowballs" in a highly efficient and accurate manner.

The template of FIG. 4 is similar to that of FIGS. 1 and 3. It is constructed of a relatively rigid, transparent or translucent material such as acrylic. The template shown includes four squares formed by spaced slots along straight lines as shown at 202, 203 and 204 and the outer periphery. More than four sizes of squares may be included. These lines form cut lines for the desired size of the snowballs. The template also includes diagonal sewing lines 221, 222, 223, 224 in each quadrant of the square of a given size. Spaced slots are formed along each sew line so that sew lines can be marked on the fabric through the template. Vertical cut line 210-212 and horizontal cut line 213-211 are also formed by a plurality of spaced slots through the template.

The template is used in the following manner. Assuming a 4½" snowball is desired, two pieces of fabric with right sides together are placed on a cutting mat and the cut liens are marked on the fabric using the 4½" square slots. Horizontal and vertical cut lines are also marked to the edge of the 4½ inch square.

Figure 5:
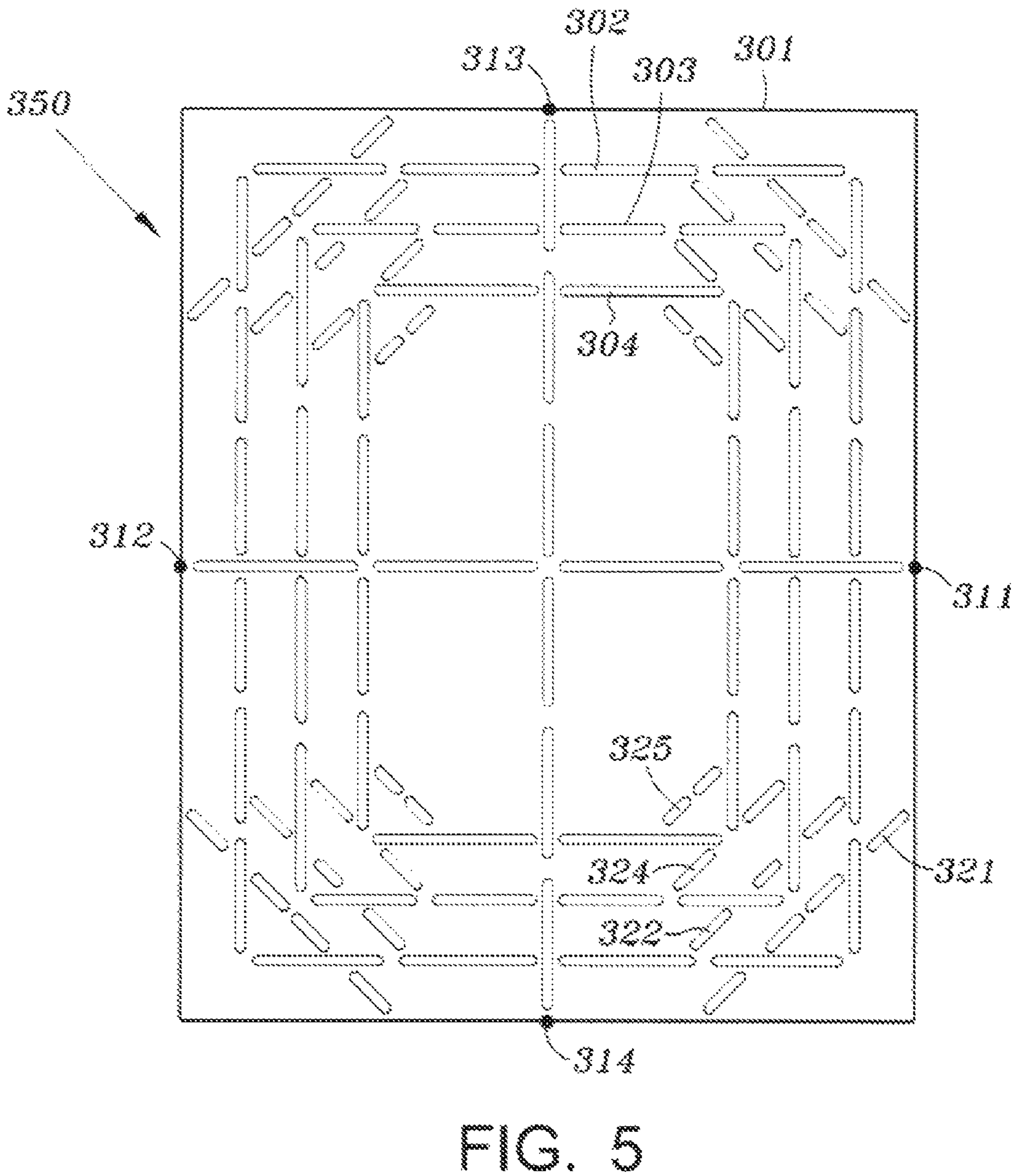
FIG. 5 is a top view of a further embodiment of the invention.

Diagonal sew lines are then marked in each quadrant of the square. Next the fabric layers are pinned together in a suitable manner so that the two square pieces of material are perfectly lined up. The next step is to sew along the diagonal sewing lines. Having finished sewing along the sew lines, the cut lines are next cut from 213 to 217 and from 210 to 212 through the top fabric only forming four smaller squares. The four smaller squares can now be folded over the diagonal sewing lines so that they extend outside the perimeter of the bottom layer of fabric. The final steps are to cut the corners of the large square a ¼" outside the sew line and then trim the folded portion of the smaller squares to line up with the outside perimeter of the large square. The net result is a square of the selected size with the main portion showing the pattern of the bottom fabric and a triangular section in each corner showing the pattern of the second fabric. Yet another embodiment of the invention is disclosed in FIG. 5.

This embodiment is similar to that shown in FIG. 4. The difference is that the final shape of the pieces will be a rectangle instead of a square. Four rectangles are formed at 302, 303 and 304 with straight spaced slots through the template body 350 which is also constructed from a transparent or translucent, rigid material like acrylic. Cut lines represent the outer periphery of the rectangles. Horizontal and vertical cut lines 311-312 and 313-314 are also formed by spaced slots through the template as well as sew lines 321-322-323 and 324 in each quadrant formed by cut lines 311-312 and 313-314.

The manner of forming rectangular snowballs is the same as the above with regard to square snowballs.

Although the present invention has been described with respect to specific details, it is not intended that such details should be regarded as limitations on the scope of the invention, except to the extent that they are included in the accompanying claims.

It is understood that modifications to the invention may be made as might occur to one skilled in the field of the invention within the scope of the appended claims. All embodiments contemplated hereunder which achieve the objects of the invention have not been shown in complete detail. Other embodiments may be developed without departing from the spirit of the invention or from the scope of the appended claims. Although the present invention has been described with respect to specific details, it is not intended that such details should be regarded as limitations on the scope of the invention, except to the extent that they are included in the accompanying claims.

I claim:

1. A template and ruler for marking fabric comprising a rectangular shaped body member having four edges and a front surface and a rear fabric contacting surface, a plurality of spaced slots arranged in straight lines, the slots extending from the front surface to the rear surface so that a marking device may be used to trace cutting and sewing lines onto the fabric, the cutting lines forming a first rectangle within the template and forming a rectangle at each corner of the template, sewing lines along each side of the first rectangle cutting lines and parallel thereto and sewing lines on either side of diagonal cutting lines formed in each of the corner rectangles.

2. A template and ruler for marking, cutting and sewing lines on fabric comprising:

a substantially rigid, flat planar member having a front surface and a rear surface adapted to lie flat on fabric; the planar member having a perimeter in the shape of a rectangle;

a plurality of sewing and cutting lines each sewing line and each cutting line formed by spaced apart slots extending through the planar body from the front surface to the rear surface; and at least one of the cutting lines and at least one of the sewing lines extending between two points on the periphery of the planar member.

3. The template of claim 2 further including a horizontal and vertical cutting line which intersect at the center of the rectangles and form four quadrants.

4. The template of claim 3 further including a diagonal sewing line in each quadrant extending between adjacent sides of the rectangle.

5. A template and ruler as claimed in claim 4 wherein the body is formed of transparent or rectangular plastic or acrylic material.

6. A template and ruler according to claim 4 wherein the rigidity of the body is such that the edges can be used as a straight edge for guiding a cutting tool.

7. A template and ruler according to claim 6 wherein the plastic material is acrylic.

8. A template and ruler according to claim 4 wherein the cutting lines form twelve half square triangles.

9. A template and ruler according to claim 4 wherein the cutting lines form twenty four half square triangles.

10. A template device for marking fabric to be sewn and cut comprising:

a generally rigid and planar member having a first surface and a second surface adapted to engage fabric;

a plurality of cutting lines each formed by a plurality of spaced slots through the planar member, extending in a straight line;

a plurality of sewing lines each formed by a plurality of spaced slots extending through the planar member in a straight line; and the cutting lines forming a plurality of concentric rectangles.

11. The template of claim 10 wherein the rectangles are squares.

12. A method of making a snowball type pattern blocks of fabric for use in quilting comprising:

forming two rectangular pieces of fabric of the same size and placing them with right sides together;

marking on the fabric a vertical and a horizontal cut line thereby forming four quadrants;

marking a diagonal sewing line in each guardant that extends between adjacent sides of the rectangle;

sewing along the sewing lines;

cutting only the top layer of fabric along the vertical and horizontal cutting lines;

cutting off the two layers of fabric outside the sewing line in each quadrant; and squaring off the remaining portion of the top layer so as to form a rectangular snowball block.

13. A template and ruler for marking and cutting fabric to facilitate the formation of half rectangular triangles comprising:

a flat, generally rectangular shaped body made of a rigid plastic material, the body having an upper edge, a lower edge and two side edges and a front planar surface and a rear planar surface that contacts the fabric when in use, a plurality of straight cutting lines and straight sewing lines formed in the template, each cutting line and each sewing line formed by a plurality of spaced slots extending from the front planar surface to the rear planar surface, and each straight cutting line having a straight sewing line on one side of it and parallel thereto.

14. A template and ruler as claimed in claim 13 wherein some of the sewing and cutting lines extend from one edge to another edge.

15. A template and ruler as claimed in claim 14 further including a plurality of addition cutting lines extending from the bottom edge to the top edge and to the side edges such that all the cutting lines together form a plurality equally sized half rectangular triangles.

16. A template and ruler as claimed in claim 13 wherein each straight cutting line has a straight sewing line on both sides of it and parallel thereto.

* * * * *